(12) United States Patent
McNabb et al.

(10) Patent No.: US 11,460,126 B2
(45) Date of Patent: Oct. 4, 2022

(54) DETECTING APPARATUS AND METHOD

(71) Applicant: BAKER HUGHES ENERGY TECHNOLOGY UK LIMITED, Bristol (GB)

(72) Inventors: John Cross McNabb, Newcastle upon Tyne (GB); Philip Michael Nott, Newcastle upon Tyne (GB)

(73) Assignee: GE OIL 7 GAS UK LIMITED, Bristol (GB)

( * ) Notice: Subject to any disclaimer, the term of this patent is extended or adjusted under 35 U.S.C. 154(b) by 694 days.

(21) Appl. No.: 16/464,756

(22) PCT Filed: Oct. 3, 2017

(86) PCT No.: PCT/GB2017/052960
§ 371 (c)(1),
(2) Date: May 29, 2019

(87) PCT Pub. No.: WO2018/109426
PCT Pub. Date: Jun. 21, 2018

(65) Prior Publication Data
US 2021/0148486 A1 May 20, 2021

(30) Foreign Application Priority Data

Dec. 12, 2016 (GB) ..................... 1621120

(51) Int. Cl.
*F16L 1/12* (2006.01)
*F16L 53/38* (2018.01)
(Continued)

(52) U.S. Cl.
CPC .............. *F16L 1/123* (2013.01); *F16L 11/083* (2013.01); *F16L 11/127* (2013.01); *F16L 53/38* (2018.01); *G01K 1/143* (2013.01)

(58) Field of Classification Search
CPC .......... F16L 1/123; F16L 53/38; F16L 11/083; F16L 11/127; G01K 1/143
See application file for complete search history.

(56) References Cited

U.S. PATENT DOCUMENTS 5,009,505 A 4/1991 Malvern
5,191,206 A 3/1993 Boiarski et al.
(Continued)

FOREIGN PATENT DOCUMENTS

CN 1712919 A 12/2005
CN 201868135 U 6/2011
(Continued)

OTHER PUBLICATIONS

Notification of the First Office Action in related CN Application No. 2017800760482 dated Dec. 16, 2020.
(Continued)

*Primary Examiner* — Craig M Schneider
*Assistant Examiner* — David R Deal
(74) *Attorney, Agent, or Firm* — Troutman Pepper Hamilton Sanders LLP; Ryan A. Schneider

(57) ABSTRACT

A method and apparatus for detecting pipe entrenchment or upheaval of a flexible pipe and/or the presence of an external feature to the flexible pipe. The method includes helically winding a temperature sensing element around a layer of a flexible pipe, helically winding a heating element around a layer of a flexible pipe, heating the heating element to a pre-determined temperature, measuring the temperature at at least two locations along the flexible pipe, comparing the measured temperature response at the at least two locations, and making a determination, from the comparison of measured responses, regarding the exterior vicinity of the pipe at one of the at least two locations.

12 Claims, 7 Drawing Sheets

(51) Int. Cl.
    *F16L 11/08*       (2006.01)
    *F16L 11/127*    (2006.01)
    *G01K 1/143*    (2021.01)

(56)                 References Cited

U.S. PATENT DOCUMENTS

| | | |
|---|---|---|
| 2012/0170610 A1* | 7/2012 | Ramos ............... G01M 3/28 |
| | | 374/5 |
| 2012/0179390 A1 | 7/2012 | Kimmiau |
| 2015/0177042 A1 | 6/2015 | Song et al. |
| 2016/0266001 A1* | 9/2016 | Mcnab ............... G01M 3/38 |
| 2018/0231149 A1* | 8/2018 | Glejbol ............ G01M 5/0025 |

FOREIGN PATENT DOCUMENTS

| | | |
|---|---|---|
| CN | 202471302 U | 10/2012 |
| CN | 205538772 U | 8/2016 |
| JP | H09229781 A | 9/1997 |
| JP | 2010185729 A | 8/2010 |
| WO | 2010034986 A1 | 4/2010 |
| WO | 2010118342 A1 | 10/2010 |

OTHER PUBLICATIONS

International Search Report and Written Opinion issued in PCT/GB2017/052960 dated Dec. 11, 2017.

\* cited by examiner

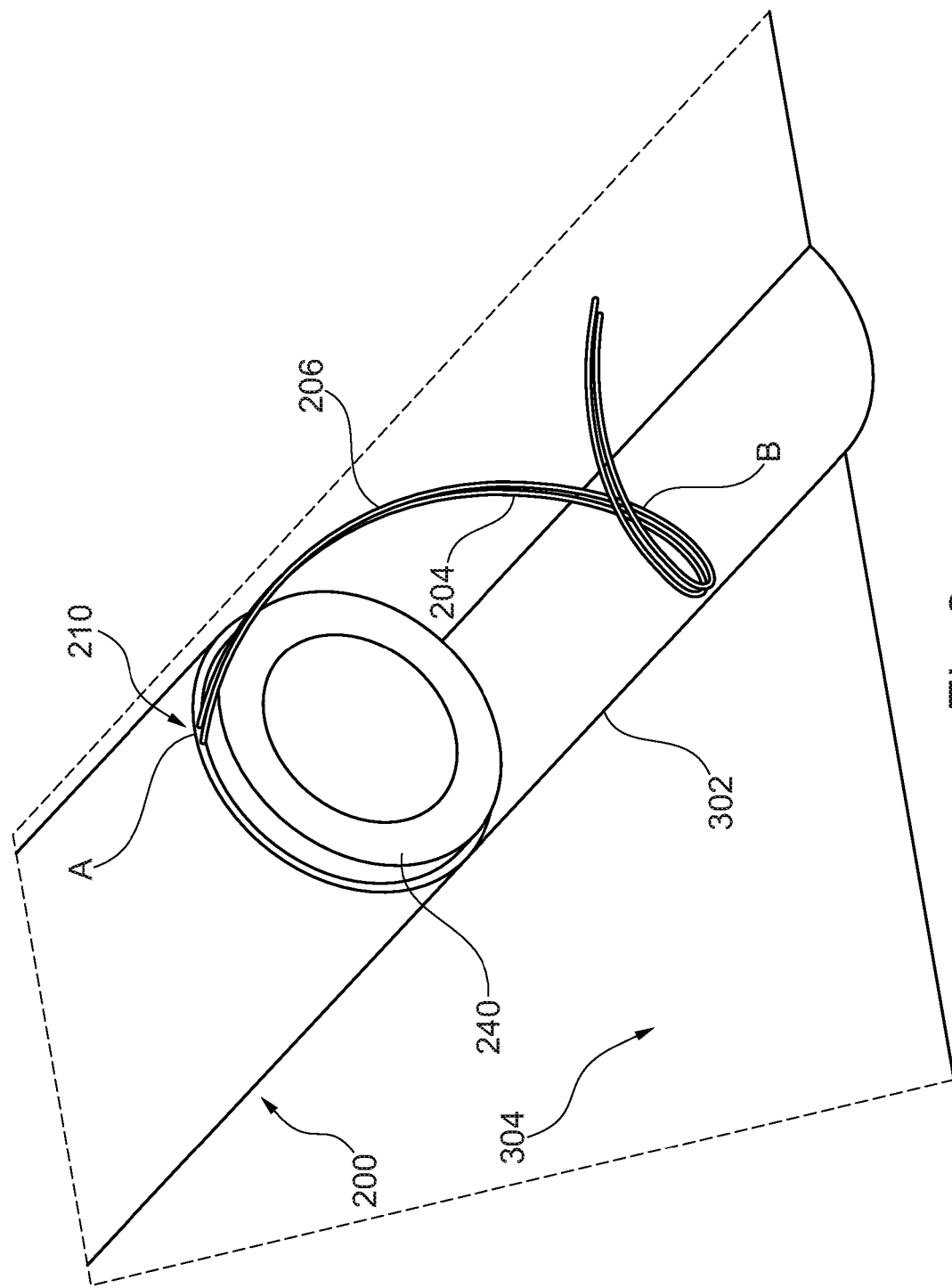

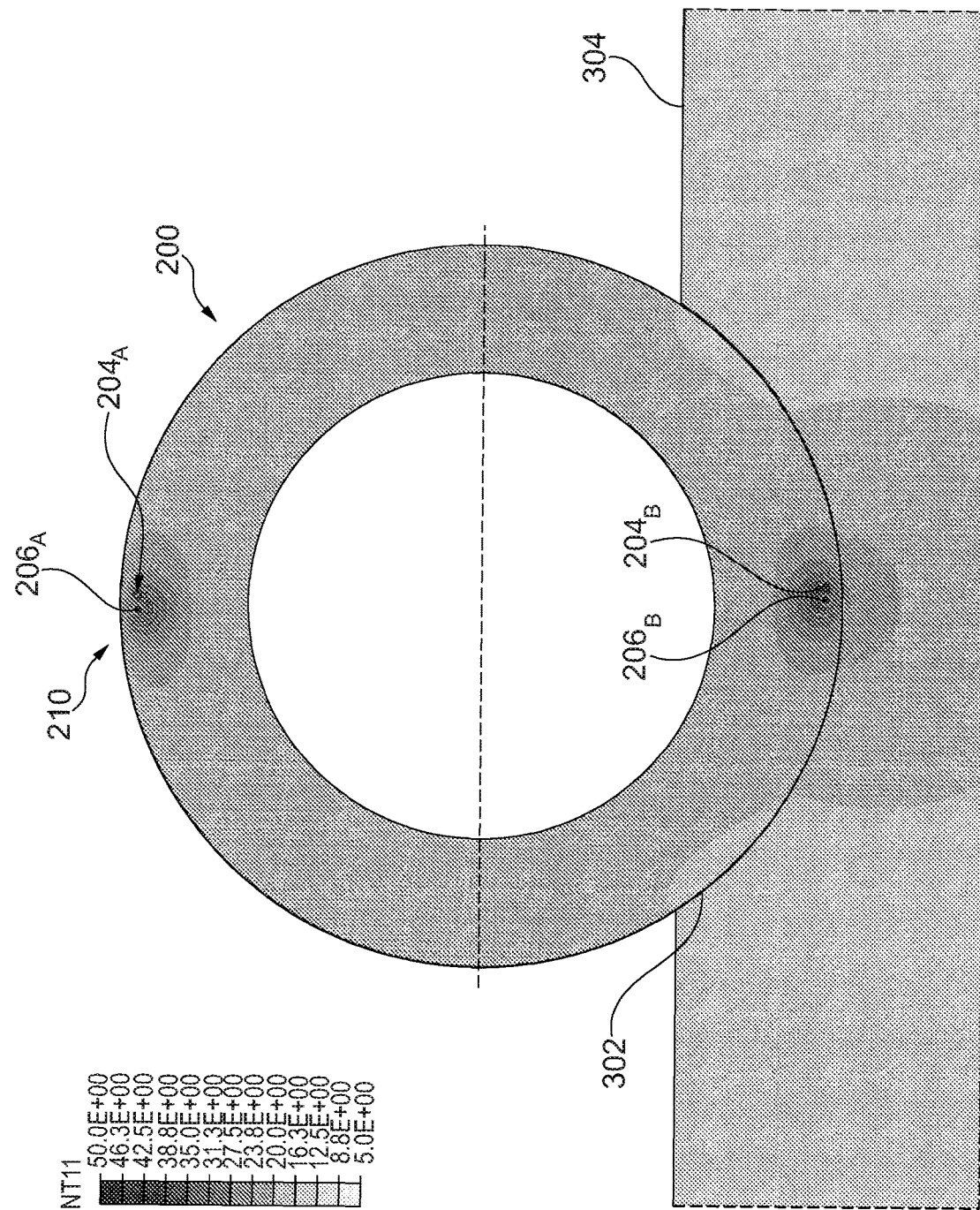

DETECTING APPARATUS AND METHOD

The present invention relates to an apparatus and method. In particular, but not exclusively, the present invention relates to a method for detecting entrenchment or upheaval of a flexible pipe (e.g. in the seabed) and/or the presence and location of an external feature to a flexible pipe, and an apparatus for the same.

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased.

Flexible pipe may also be used for shallow water applications (for example less than around 500 metres depth) or even for shore (overland) applications.

In some instances, where the flexible pipe runs at least in part along the ocean floor, the flexible pipe may become entrenched. In some situations, entrenchment of a pipe in the seabed is wanted (e.g. for protection of the pipe) and therefore pipe upheaval is undesirable. However, in other situations, unplanned entrenchment of a portion of pipe (e.g. on an uneven seabed or as a result of seabed liquefaction due to seismic activity) is not desirable, as this may inhibit the ability to visually inspect the pipe and/or subject the pipe to localised stresses.

In some instances it is important to be able to detect the presence and confirm the location of external features to the flexible pipe, for example pipe ancillaries, e.g. to confirm they have not been dislodged and fallen away or that the position relative to each other are as specified and within tolerance. Other examples of external features to a pipe includes marine growth, which may be undesirable.

With known temperature monitoring techniques, for example using optical fibres, it is possible to accurately monitor the temperature of sections of pipe. However if the temperatures of operation of the pipe are such that there is only a very small thermal gradient between the bore of the pipe (and the fluids therein) and the external environment it is not possible to detect any changes in temperature representing a change in condition of the pipe or ancillary equipment on the pipe.

According to a first aspect of the present invention there is provided a method for detecting pipe entrenchment or upheaval of a flexible pipe and/or the presence of an external feature to the flexible pipe, the method comprising the steps of helically winding a temperature sensing element around a layer of a flexible pipe; helically winding a heating element around a layer of a flexible pipe; heating the heating element to a pre-determined temperature; measuring the temperature at at least two locations along the flexible pipe; comparing the measured temperature response at the at least two locations; and making a determination, from the comparison of measured responses, regarding the exterior vicinity of the pipe at one of the at least two locations.

According to a second aspect of the present invention there is provided an apparatus for detecting entrenchment or upheaval of a flexible and/or the presence of an external feature to the flexible pipe, comprising a temperature sensing element provided at a location radially outwards of a layer of a flexible pipe; a heating element provided at a location radially outwards of the layer of a flexible pipe; a controller for controlling the heating element to heat to a pre-determined temperature; measuring the temperature at at least two locations along the flexible pipe; comparing the measured temperature response at the at least two locations; and making a determination, from the comparison of measured responses, regarding the exterior vicinity of the pipe at one of the at least two locations.

Certain embodiments of the invention provide the advantage that entrenchment or upheaval of a flexible pipe and/or the presence of an external feature to a flexible pipe can be detected with a greater sensitivity compared to known arrangements.

Certain embodiments of the invention provide the advantage that a change in circumstances of a flexible pipe or ancillary equipment can be detected irrespective of the operating temperature of the pipe.

Certain embodiments of the invention provide the advantage that entrenchment or upheaval of a flexible pipe and/or the presence of an external feature to a flexible pipe can be detected for insulated pipes.

Embodiments of the invention are further described hereinafter with reference to the accompanying drawings, in which:

FIG. 2b illustrates a close up view of a portion of the pipe body and apparatus of FIG. 2a;

FIG. 3 illustrates a cutaway perspective view of the flexible pipe body and apparatus;

FIG. 4a illustrates a simulated temperature map of the cross-section shown in FIG. 2a;

FIG. 4b illustrates a close up view of a part of the cross-section of FIG. 4a;

FIG. 4c illustrates a close up view of a part of the cross-section of FIG. 4a;

In the drawings like reference numerals refer to like parts.

Figure 1:
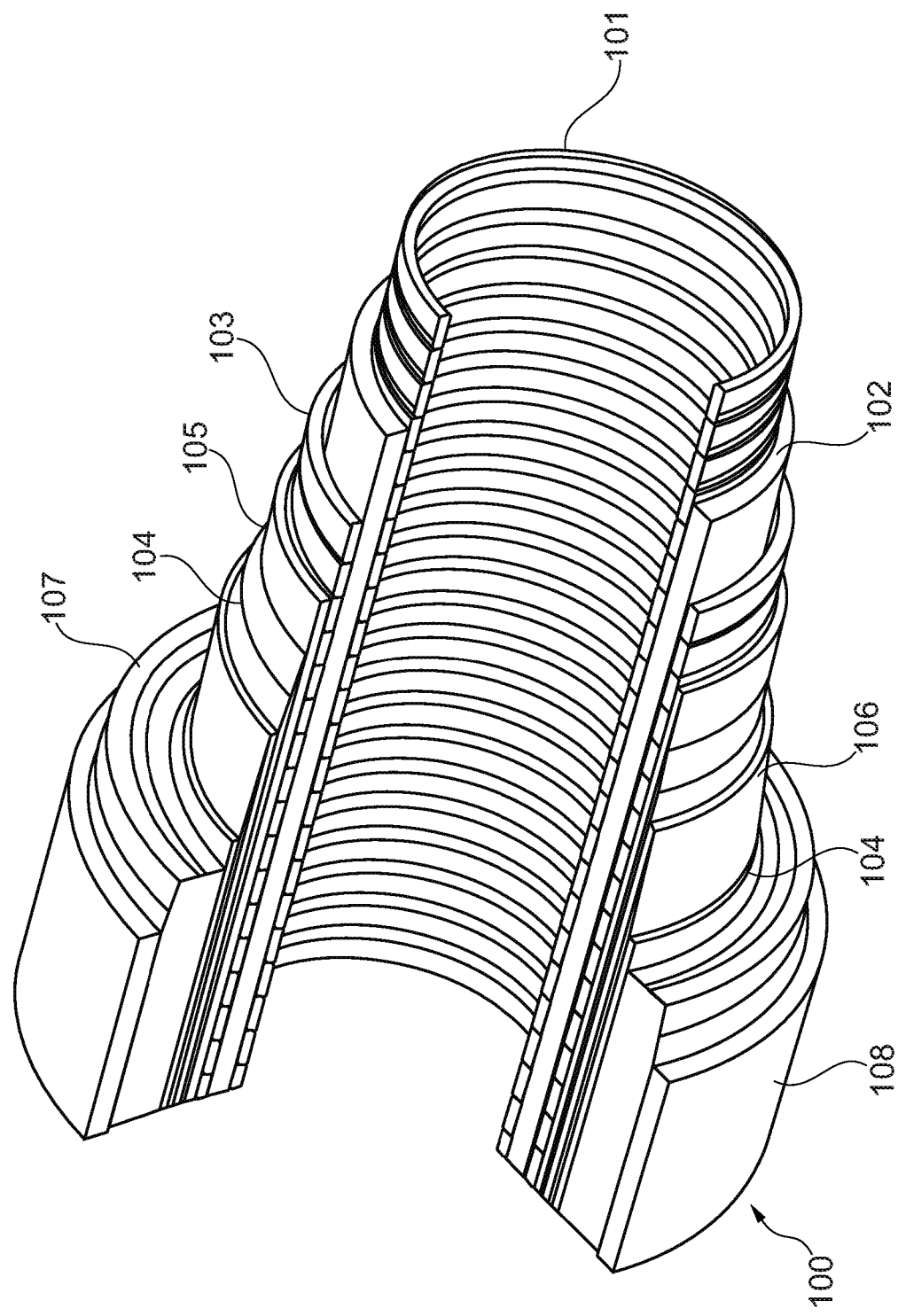
FIG. 1 illustrates a flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

An aspect of the invention relates generally to a method for detecting pipe entrenchment or upheaval of a flexible pipe and/or detecting the presence of an external feature to the flexible pipe by comparing the temperature at at least two locations of a temperature sensing element, which has been heated to a pre-determined temperature by a heating element.

Figure 2A:
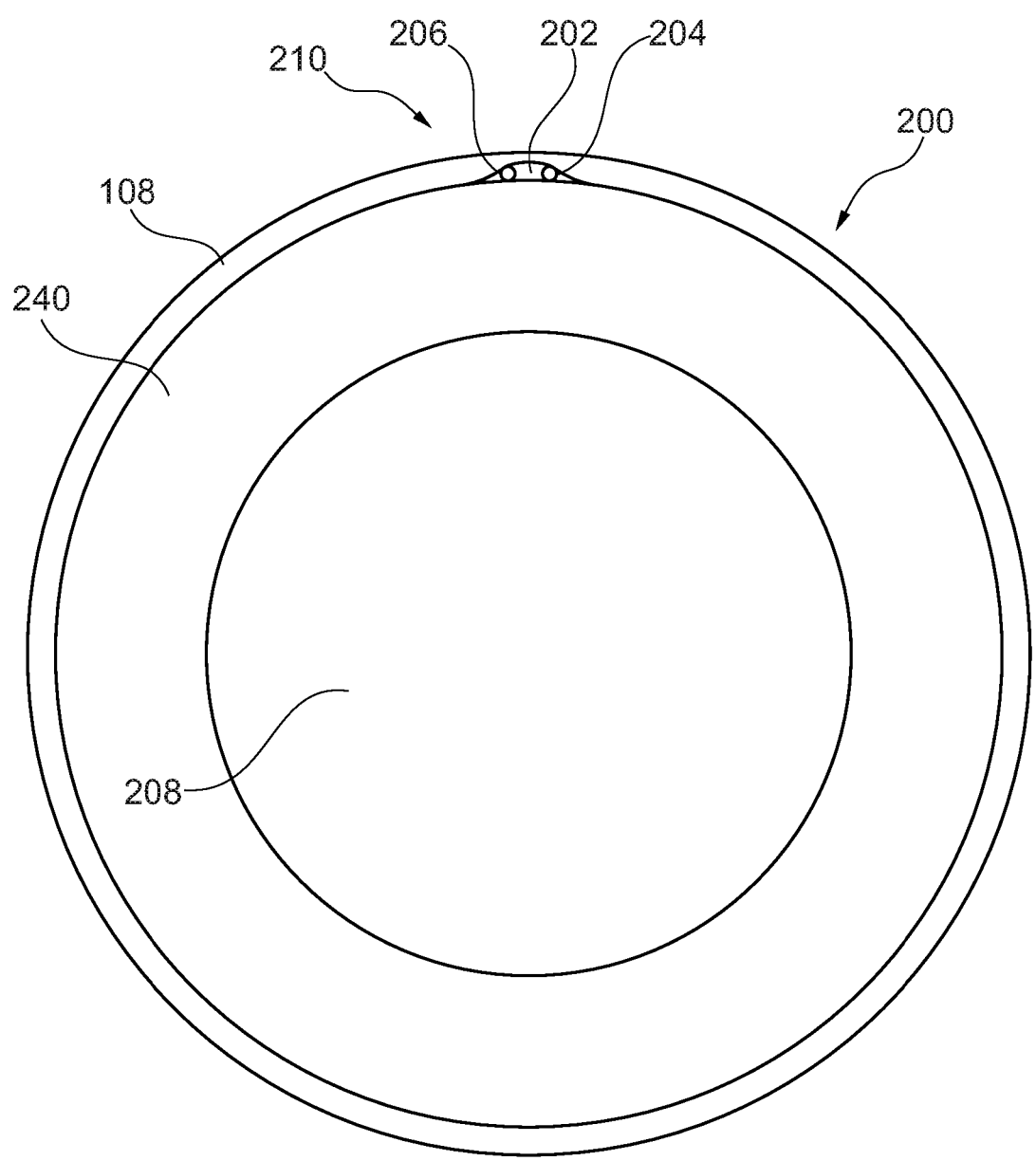
FIG. 2a illustrates a cross-section of a flexible pipe body with an apparatus for detecting pipe entrenchment of the flexible pipe body.
Figure 2B:
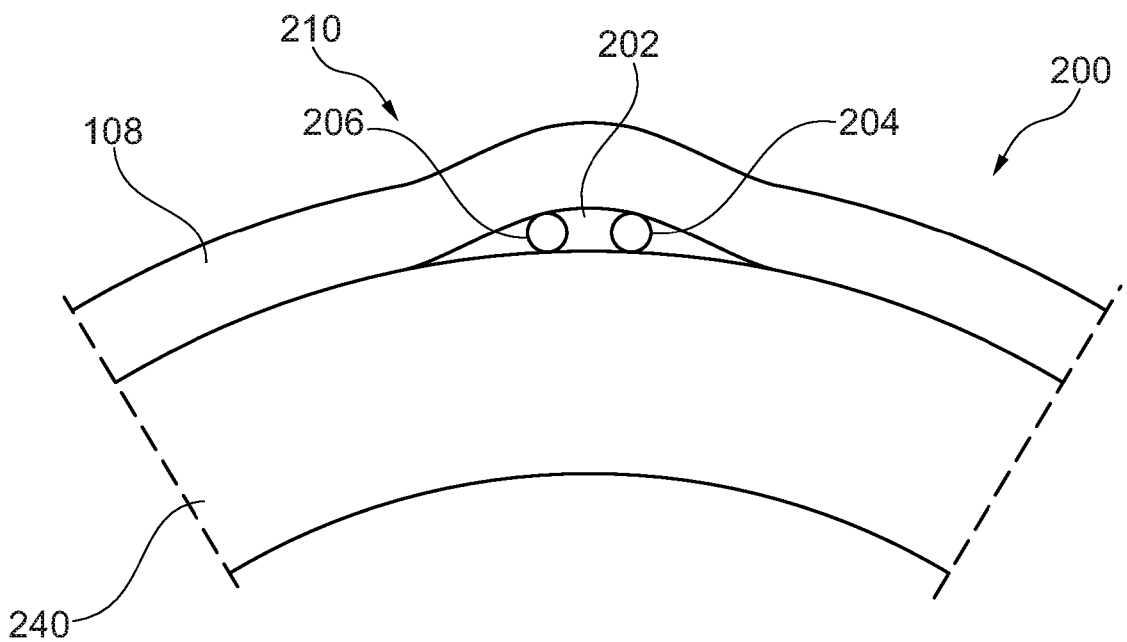

FIGS. 2a and 2b illustrate an apparatus 210 for detecting entrenchment of a flexible pipe 200, including a temperature sensing element 204 around a layer of the flexible pipe 200 and a heating element 206 around the layer of the flexible pipe. In this example, the temperature sensing element 204 and the heating element 206 are both located around the insulation layer 107. That is, the temperature sensing element 204 and the heating element 206 are located at a position between the insulation layer 107 and the outer sheath 108. The heating element 206 is adjacent the temperature sensing element 204. The heating element and the temperature sensing element are provided in a gap 202 between the insulation layer 107 and the outer sheath 108.

Although layers 101 to 107 of the flexible pipe 200, are the same as the corresponding distinct layers in FIG. 1, they are shown as one single body 240 for clarity in FIGS. 2a and 2b.

In this example, the temperature sensing element is a fibre optic element. In this example, the heating element is an electrically resistive heating element with a power of substantially 50 watts per meter, although any suitable heating element with suitable power requirements may be used. This may be operated in a continuous or zoned manner.

Both the temperature sensing element and the heating element are elongate filaments that extend along the length of the pipe.

FIG. 3 illustrates a cutaway perspective view of the flexible pipe 200 and apparatus 210.

The temperatures sensing element and heating element each extend in a helix along the length of the pipe.

During manufacture of the flexible pipe, the apparatus 210 is applied to the flexible pipe 200 by helically winding the temperature sensing element 204 around a layer of the flexible pipe 200 and helically winding the heating element 206 around a layer of the flexible pipe 200. In this example, the temperature sensing element 204 and the heating element 206 are both helically wound around the insulation layer 107. In this example, the temperature sensing element 204 and the heating element 206 are helically wound simultaneously around the layer of flexible pipe.

Once the temperature sensing element 204 and the heating element 206 have been helically wound around the layer of flexible pipe, an outer sheath layer 108 is applied over the layer. The tension in the outer sheath layer 108 and/or the stiffness of the outer sheath layer may produce a gap 202 between the outer sheath and the temperature sensing element 204 and heating element 206.

The temperature sensing element and the heating element are located proximate to each other, so that the heat generated by the heating element may be detected by the temperature sensing element. In this example, the temperature sensing element is 30 mm away from the heating element for a pipe with external diameter 300 mm, although they may be placed at any distance suitable to work together. The temperature sensing element and the heating element may also be carried in a tape or sheath element such as that disclosed in EP2725186 A1.

Figure 6:
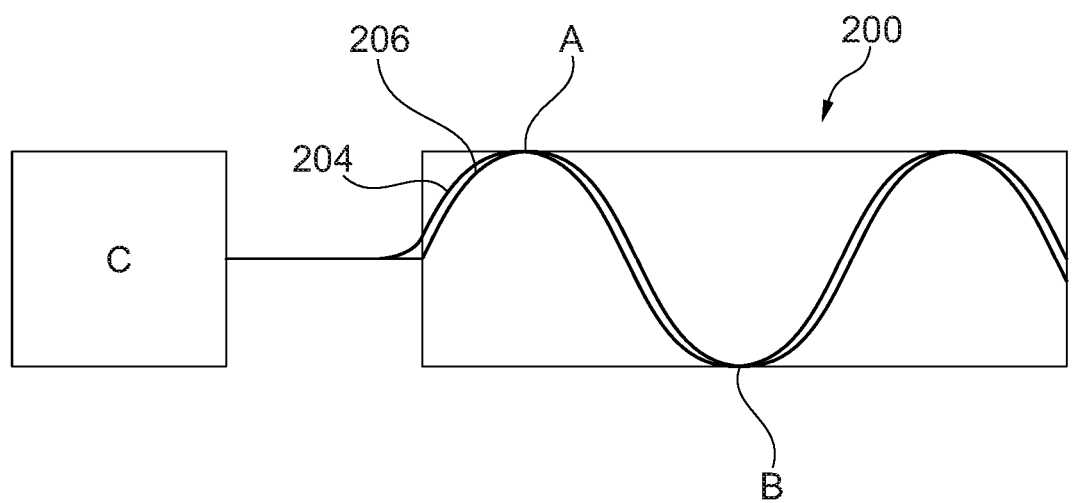
FIG. 6 illustrates a controller connected to a heating element and temperature sensing element.

The apparatus 210 further includes a controller C, as shown in FIG. 6, connected to the heating element and the temperature sensing element. The controller is for controlling the heating element 206 to heat to a pre-determined temperature, measuring the temperature at at least two locations along the flexible pipe. The controller compares the measured temperature responses and makes a determination regarding the exterior vicinity of the pipe at one of the at least two locations. That is, the controller determines from the comparison of measured temperature responses at the at least two locations whether the flexible pipe 200 has been entrenched and/or an external feature is present at one of the at least two locations. In this example the controller uses Raman based distributed temperature sensing to measure the temperature at at least two locations, although any suitable temperature measuring method may be used, for example Brillouin, or fibre-Bragg-gratings. In this example the controller controls the heating of the heating element via an interface between the fibre-optic interrogator and the electrical resistive heating element power supply to modulate or regulate the heat depending on the requirements of the deployment.

In this example, the controller determines whether the flexible pipe 200 has been entrenched in trench 302 on the ocean floor 304, as described below.

During use, the heating element is heated until it reaches a pre-determined temperature. For this example, the heating element takes 20 mins to heat up to the pre-determined temperature.

FIG. 4a illustrates a simulated temperature map of the flexible pipe 200 and apparatus 210 once the heating element 206 has been heated to the pre-determined temperature. In this example, the heating element 206 is heated to 50 degrees Celsius (° C.). In this example, the temperature of the fluid in the pipe bore 208 is 10° C. and the temperature of the sea is 5° C.

In this example, the controller measures the temperature at locations A and B on the temperature sensing element 204, which are axially offset along the pipe, as shown in FIG. 3.

Figure 4B:
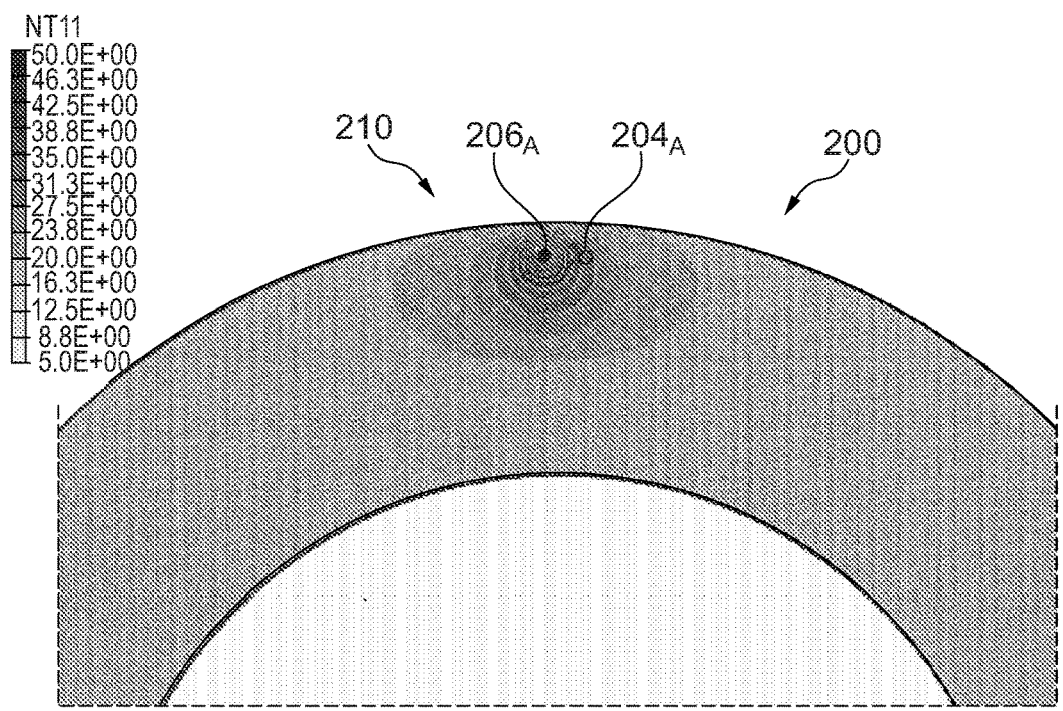
Figure 4C:
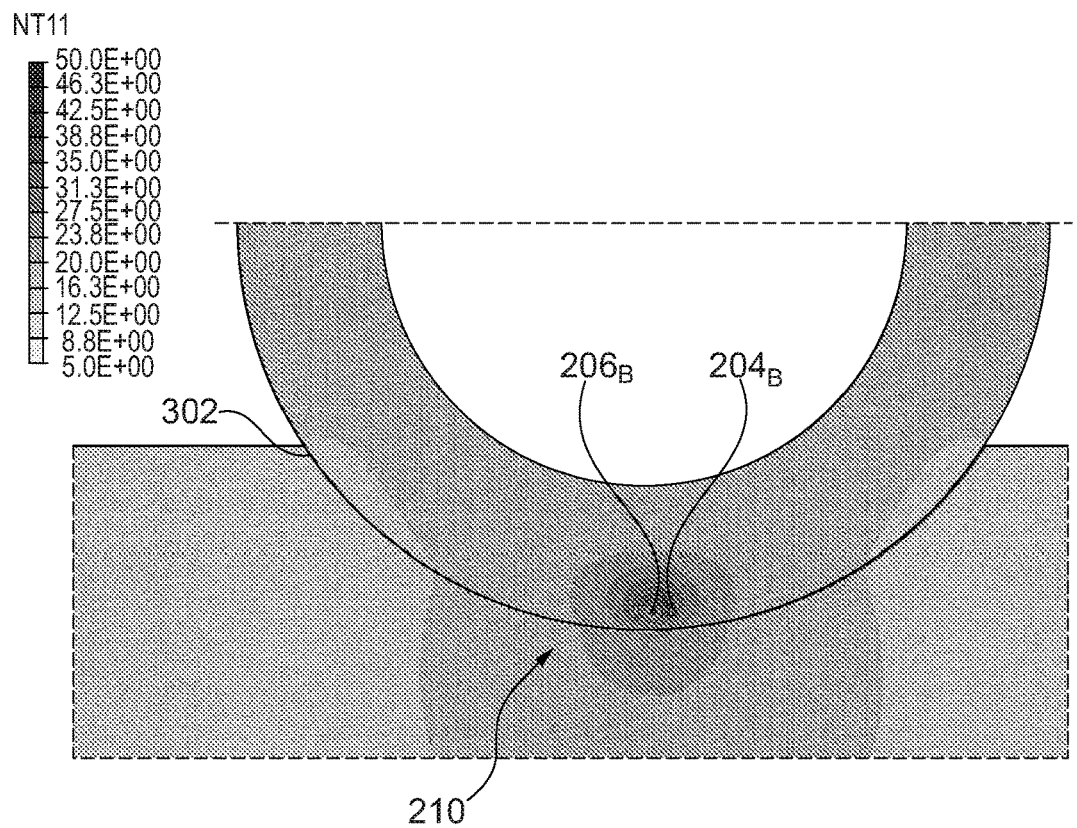

FIG. 4a is an illustration of a temperature map of temperatures in the region of a heating element 206. The upper part of the illustration (above the dashed line) shows the heating element in a location $206_A$ away from the seabed. This cross-sectional view has been merged with another cross-section view at a location $206_B$ where the heating element is proximate at a seabed 304 (below the dashed line). That is, the temperature sensing element at different longitudinal positions A and B has been shown as $204_A$ and $204_B$ respectively. FIGS. 4b and 4c illustrate the apparatus 210 at separate locations A and B respectively.

Over time, the heat generated by the heating element 206 is dissipated away from the heating element, as shown by the heat contours in FIG. 4a. That is, the heat generated by the heating element 206 is dissipated into the layers of flexible pipe surrounding the heating element and subsequently into the area surrounding the flexible pipe. The sea and the trench 302 offer differing levels of insulation to the flexible pipe 200, such that when entrenched, the heat generated by the heating element 206 is dissipated differently at different positions along the flexible pipe 200. That is, the heat generated by the heating element 206 at position A, where the flexible pipe 200 is exposed to the sea, will dissipate away from the flexible pipe 200 quicker than at position B, where the flexible pipe 200 is entrenched within trench 302, due to the thermally insulating effect of the trench 302.

The temperature measured by the controller at locations A and B through the temperature sensing element 204A and 204B respectively, will be different as a result of the differing levels of insulation. In this example, the temperature measured at location A will be lower than the temperature measured at location B.

The controller therefore determines that the flexible pipe has been entrenched and/or an external feature is present at one of the at least two locations if the temperature difference or the temperature ratio between said one of the at least two locations and another of the at least two locations is above a threshold value.

That is, in this example, the flexible pipe is determined to have been entrenched if the temperature difference or the temperature ratio between locations A and B is above a threshold value.

The temperature difference threshold value may be be 3° C. Alternatively the temperature difference threshold value be another smaller or larger difference, depending on the conditions, location and circumstances of the pipe in question. The temperature ratio threshold value will be completely dependent on the initial (normal operating) temperature for the pipe in that position, but can be determined and set for a specific location.

In this example, the heating element 206 is switched off prior to measuring the temperature at locations A and B along the flexible pipe. In this way, the temperature difference/temperature ratio between the two locations will become more pronounced with time as the heat is dissipated away from the heating element at different rates due to the differing levels of insulation. That it, the transient cool down rate is monitored, because during this stage the difference in the rate of heat dissipation is emphasised.

The method for detecting pipe entrenchment of a flexible pipe as described in the above embodiment includes the steps of helically winding a temperature sensing element around a layer of a flexible pipe, helically winding a heating element around a layer of a flexible pipe, heating the heating element to a pre-determined temperature, measuring the temperature at at least two locations along the flexible pipe, comparing the measured temperature response at the at least two locations, and determining from the comparison of measured temperature responses at the at least two locations whether the flexible pipe has been entrenched and/or an external feature is present at one of the at least two locations.

Various modifications to the detailed arrangements as described above are possible. For example, the heating element and temperature sensing element of the apparatus may be located in any suitable location within the flexible pipe. The heating element and temperature sensing element may be located between any two layers of the flexible pipe, for example between the outer sheath 108 and armour layer 106 (i.e. the insulation layer between said layers is optional).

In general, the more insulated the flexible pipe, the more beneficial it is to have the heating element and the temperature sensing element close to the radial exterior of the pipe, i.e. as close as possible to the features/entrenchment/upheaval that the apparatus is trying to be detected. As such, the temperature sensing element and the heating element may be attached to the exterior of the flexible pipe, i.e. to the radial exterior of the outer sheath 108. In this way the apparatus may be retrofitted to existing flexible pipes.

Figure 5:
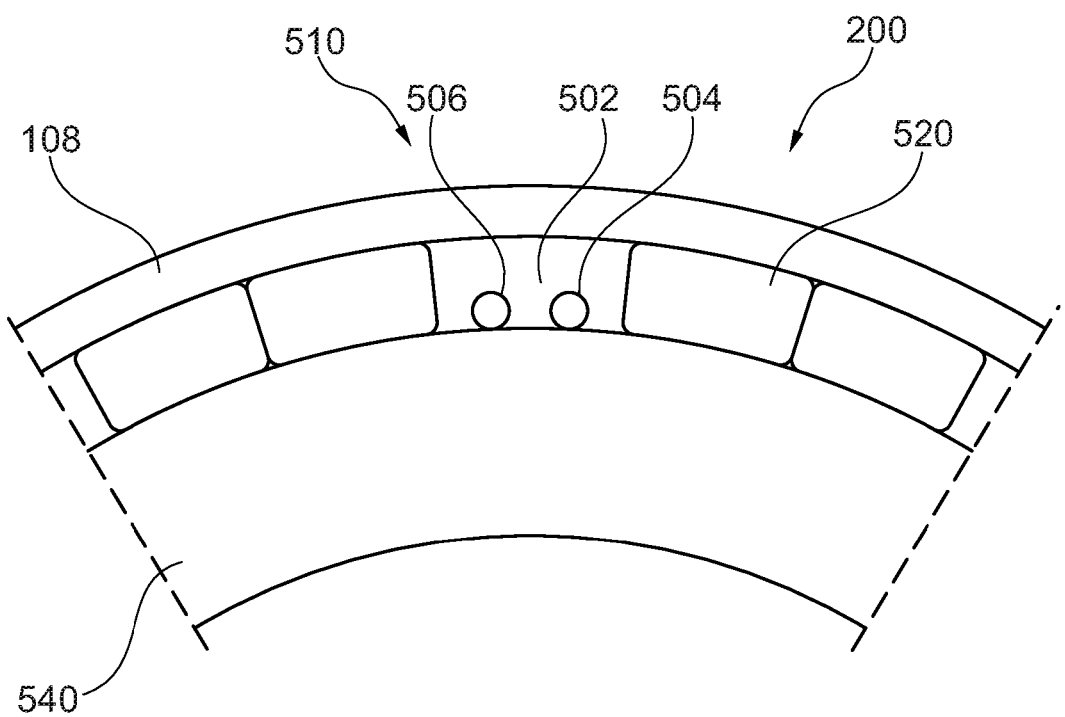
FIG. 5 illustrates a cross-section of a part of a flexible pipe body with another apparatus for detecting pipe entrenchment of the flexible pipe body.

Alternatively the heating element and temperature sensing element may be located within a layer of the flexible pipe. For example, as shown in FIG. 5, the heating element and temperature sensing element may be located in a gap 502 between armour windings of armour layer 106, which is located radially outwardly of body 540. That is, the temperature sensing element and the heating element may be wound between armour windings of an armour layer. The gap 502 may be a small opening between armour windings or, as shown in FIG. 5, it may be a larger gap as the result of the absence of an additional armour winding. The outer sheath may then be provided over the armour layer. Aptly, the temperature sensing element and the heating element may be embedded within a groove in an armour winding.

Rather than a filament type heating element, the heating element may be a heated layer of the pipe body.

The apparatus and method of all the described embodiments may be used to detect an external feature to a flexible pipe. The external feature may be a pipe ancillary. External features to the flexible pipe may have a similar thermally insulating effect on the heat dissipation from the heating element as does the trench 302. Therefore the presence of an external feature at a specific location can be detected in the same manner as for detecting entrenchment of a flexible pipe. In addition, if it is known that an external feature is present but the location of said external feature is unknown, the location of the external feature can be determined by testing for the presence of the external feature at a plurality of locations.

The apparatus and method of all the described embodiments may be used to detect upheaval of a flexible pipe. Upheaval of the flexible pipe will affect the heat dissipation from the heating element at the position of pipe upheaval, i.e. the position of the pipe that was previously entrenched will be less thermally insulated once it has been upheaved. Therefore the occurrence of pipe upheaval can be detected by using the same method as for detecting pipe entrenchment, however using different temperature threshold values.

In another embodiment, there may be no gap 202 as a result of placing the heating element 206 and the temperature sensing element 204 between layers of the flexible pipe. If the outer sheath, or indeed any radially outer layer over the apparatus, is compliant and flexible it may form around the temperature sensing element and heating element.

In another embodiment, the heating element and temperature sensing element may be combined into a single entity, which are helically wound together around a layer of the flexible pipe. For example, the heating element and temperature sensing element may both be contained within an elongate flexible tubular sheath, which is wound around a layer of the flexible pipe.

In another embodiment, the heating element may not be switched off prior to measuring the temperature. In this embodiment, the thermally insulating effect of entrenchment and/or the presence of an external feature is significant enough such that it can be measured while the heating element is still generating heat.

The heating element may be heated to any pre-determined temperature and for any duration. The temperature and duration requirements may be chosen according to the specific arrangement of flexible pipe, including the dimensions and the constituent layers, and the environmental conditions of the particular use.

Rather than heating continuously along the heating element, the heating element may provide heat at discrete locations along the heating element.

The temperature may be measured at any number of locations along the temperature sensing element.

The temperature may be compared at any number of locations along the temperature sensing element.

The apparatus may further include a further temperature sensing element and a further heating element. For example, the further temperature sensing element and the further heating element may be helically wound out of phase to the first temperature sensing element and the heating element, e.g. when the first temperature sensing element and heating element are at the top of a cross section of the flexible pipe, the further temperature sensing element and the further heating element may be at the bottom of the same cross section. The temperature measured by the first temperature sensing element and the further temperature sensing element at a corresponding location in a given cross-section may be compared to determine entrenchment or upheaval of a flexible pipe and/or the presence of an external feature to the flexible pipe.

Rather than using a helically wound arrangement for the temperature sensing element and heating element, these may be provided in other shaped pathways along the flexible pipe. For example, two or more temperature sensing elements may be provided that extend approximately in a straight line along the pipe (e.g. at opposing sides of the tubular cross section of the pipe). Other arrangements may be envisaged that enable the capture of temperature data at different areas of the pipe.

With the above-described arrangement, entrenchment or upheaval of a flexible pipe and/or the presence of an external feature to a flexible pipe can be detected.

With the above-described arrangement the additional heat generated by the heating element emphasises the thermally insulating effect caused by entrenchment, upheaval or an external feature.

With the above-described arrangement, entrenchment or upheaval of a flexible pipe and/or the presence of an external feature to a flexible pipe can be detected without relying on the temperature difference between the bore fluid of the flexible pipe and the external environment. E.g. if the temperature difference between the bore fluid and the external environment were small, the thermally insulating effect of the trench/external feature would be minimal.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method comprising:
helically winding a temperature sensing element around at least a portion of a layer of at least a portion of a flexible pipe;
helically winding a heating element around at least a portion of a layer of the flexible pipe;
heating at least a portion of the heating element to a pre-determined temperature;
measuring the temperature at two different locations along the flexible pipe;
comparing the measured temperature response at the two locations;
making a determination, from the comparison of measured responses, regarding whether the flexible pipe, at one of the two locations, has one or more:
been entrenched;
been upheaved; and
an external feature present; and
switching off the heating element prior to measuring the temperature at the two locations along the temperature sensing element.

2. The method as claimed in claim 1, wherein it is determined that the flexible pipe has been entrenched at one of the two locations if one of the temperature difference and the temperature ratio between one of the two locations and the other of the two locations is above a threshold value.

3. The method as claimed in claim 1, wherein the temperature sensing element is a fiber optic element.

4. The method as claimed in claim 1, wherein the temperature sensing element and the heating element are wound between armor windings of an armor layer.

5. The method as claimed in claim 4 further comprising applying an outer sheath layer over the armor layer.

6. The method as claimed in claim 1, wherein the temperature sensing element and the heating element are helically wound simultaneously around the same layer of the flexible pipe.

7. The method as claimed in claim 1 further comprising:
controlling the heating element to heat to a pre-determined temperature;
measuring the temperature at two different locations along the temperature sensing element;
comparing the measured temperature response at the two locations; and
determining from the comparison of measured temperature responses at the two locations whether the flexible pipe has been entrenched at one of the two locations.

8. The method as claimed claim 1, wherein it is determined that the flexible pipe has an external feature present at one of the two locations if one of the temperature difference and the temperature ratio between one of the two locations and the other of the two locations is above a threshold value.

9. The method as claimed in claim 8, wherein the external feature is a pipe ancillary.

10. The method as claimed in 1 further comprising:
controlling the heating element to heat to a pre-determined temperature;
measuring the temperature at two different locations along the temperature sensing element;
comparing the measured temperature response at the two locations; and
determining from the comparison of measured temperature responses at the two locations whether the flexible pipe has the external feature present at one of the two locations.

11. An apparatus comprising:
a temperature sensing element provided at a location radially outwards of at least a portion of a layer of at least a portion of a flexible pipe;
a heating element provided at a location radially outwards of at least a portion of the layer of at least a portion of the flexible pipe; and
a controller for:
controlling the heating element to heat to a pre-determined temperature;
measuring the temperature at two different locations along the flexible pipe;

comparing the measured temperature response at the two locations; and making a determination, from the comparison of measured responses, regarding whether the flexible pipe, at one of the two locations, has one or more:
been entrenched;
been upheaved; and
an external feature present; and switching off the heating element prior to measuring the temperature at the two locations along the temperature sensing element.

12. A method comprising:

helically winding a temperature sensing element around at least a portion of a layer of at least a portion of a flexible pipe;

helically winding a heating element around at least a portion of a layer of the flexible pipe;

heating at least a portion of the heating element to a pre-determined temperature;

measuring the temperature at different locations along the flexible pipe;

comparing the measured temperature response at at least two of the locations;

making a determination, from the comparison of measured responses, regarding the exterior vicinity of the pipe at at least one of the locations; and switching off the heating element prior to measuring the temperature at the two locations along the temperature sensing element;

wherein making the determination, from the comparison of measured responses, regarding the exterior vicinity of the pipe at at least one of the locations comprises determining the presence of an external feature to the flexible pipe; and wherein the external feature is a pipe ancillary.

* * * * *